(12) United States Patent
Zimmerman

(10) Patent No.: US 6,676,479 B1
(45) Date of Patent: Jan. 13, 2004

(54) TURKEY CALL

(76) Inventor: Jeffery A. Zimmerman, 195 Alpine Dr., Shawano, WI (US) 54166

( * ) Notice: Subject to any disclaimer, the term of this patent is extended or adjusted under 35 U.S.C. 154(b) by 41 days.

(21) Appl. No.: 09/986,738

(22) Filed: Nov. 9, 2001

(51) Int. Cl.$^7$ ................................................. A63H 5/00
(52) U.S. Cl. ...................................... 446/397; 446/418
(58) Field of Search ................................ 446/397, 418, 446/176, 180; 84/410, 364, 456; 43/2, 3

(56) References Cited

U.S. PATENT DOCUMENTS

| | | | |
|---|---|---|---|
| 2,629,968 A | * | 2/1953 | Herter .......................... 446/397 |
| 2,958,157 A | * | 11/1960 | Tannehill ..................... 446/397 |
| 4,003,159 A | * | 1/1977 | Piper ............................ 446/397 |
| 4,310,986 A | | 1/1982 | Jacobs |
| 4,586,912 A | | 5/1986 | Adams |
| 4,606,733 A | | 8/1986 | Willis |
| 4,648,852 A | * | 3/1987 | Wingate ........................ 446/397 |
| 4,854,914 A | * | 8/1989 | White, Jr. ..................... 446/402 |
| D312,426 S | | 11/1990 | Battey |
| 4,988,325 A | | 1/1991 | Alderson et al. |
| 5,178,575 A | * | 1/1993 | Koch ............................ 446/397 |
| 5,529,526 A | * | 6/1996 | Wesley ......................... 446/397 |
| 5,562,521 A | * | 10/1996 | Butler et al. ................. 446/397 |
| 5,607,091 A | * | 3/1997 | Musacchia ................... 224/222 |
| 6,095,888 A | | 8/2000 | Panepinto |
| 6,159,068 A | | 12/2000 | Trotter |

* cited by examiner

Primary Examiner—Jacob K. Ackun
Assistant Examiner—Faye Francis
(74) Attorney, Agent, or Firm—Dowell & Dowell, P.C.

(57) ABSTRACT

A turkey call including a hollow box forming a sound chamber and having a thin slate plate mounted in alignment with an opening or slot in a cover of the box and which slate resonates when vibrated by motion of a striker.

20 Claims, 3 Drawing Sheets

TURKEY CALL

BACKGROUND OF THE INVENTION

1. Field of the Invention

This invention related to devices for calling wild turkeys for hunting, photographing, and viewing using a hand held device for generating a tone or sound which mimics that of a wild turkey. The present invention relates to a turkey call which provides a large number of features not found in present turkey calls.

2. Brief Description of the Related Art

Some turkey calls cannot produce a variety of purrs, clucks, tree yelps, and calls of the wild turkey. Others cannot generate both louder and softer tones needed for use when the turkey is further or nearer to the user.

For centuries, wild turkeys have been hunted in North America. While hunting turkeys is an exciting sport, wild turkeys are very difficult to draw in. Turkeys are easily alarmed, so it is not practical to come up to turkeys because any noise produced will alarm the turkeys and they will flee the area. Typically, wild turkeys are hunted by attracting turkeys to the hunter with a call.

Turkeys have voices which vary according to gender and age. Females tend to have higher pitched voices than males and juveniles have higher pitched sounds than adults with deeper more coarse tones.

Experienced hunters and nature lovers demand a call that can imitate unique turkey language. This invention defines a turkey call that meets this requirement.

Various kinds of turkey calls are now in existence, some are bulky and difficult to use with large sounding boards. Some require complicated movements of a striker. The purpose of this invention is to create an easy to use, more compact, less fragile and better sounding turkey call.

SUMMARY OF THE INVENTION

This invention is directed to a device for mimicking turkey sounds which includes a thin piece of slate or slate-like material (herein called "slate"), a rectangular box sounding chamber, and baffles to magnify the sound that is produced when a striker is rubbed on the slate.

The sound box is constructed of flat material such as wood including sides and bottom. Interior baffles including holes are attached to the bottom of the box to resonate sound waves. The thin slate is attached to the underside of the top of the sound chamber and is vibrated as the striker is scratched on a surface of the slate. The top of the sound chamber has holes that allow sound to resonant out. The baffles break the resonant sound chamber into several sections which produce a wide range of sound frequencies necessary to imitate the sounds of wild turkeys.

The design of the sound box is such that a user needs only to draw a striker down on the sounding plate, without the necessity of sideways or other movement of the striker, making the design easy to use.

The turkey call incorporates a sound box in which slate vibrates air through a sound box which has a series of baffles, with the sound coming out of the top of the box, similar to the sound box of a violin. The baffles are constructed of thin material (e.g. wood) attached to the bottom and top of the box.

The call of the invention is designed to produce a resonance which better imitates the sound of a wild turkey's call.

The heart of the call is a hollow box with a number of holes passing through a top and into the hollow interior chamber. The holes surround a modest sized slate sounding board which is centered on the top of the box.

The slate sounding board is supported inside the interior chamber of the box by the perforated baffles. The size and position of the slate supporting baffles protects the slate and call from casual damage during field usage. The sound produced by the striker being drawn over the slate sounding board passes into the hollow chamber of the box directly below the striker and through the perforated supporting baffles to the adjacent chambers. This construction produces a wide resonance and a variable sound imitative of a wild turkey's call.

DESCRIPTION OF THE PREFERRED EMBODIMENT

Figure 1:
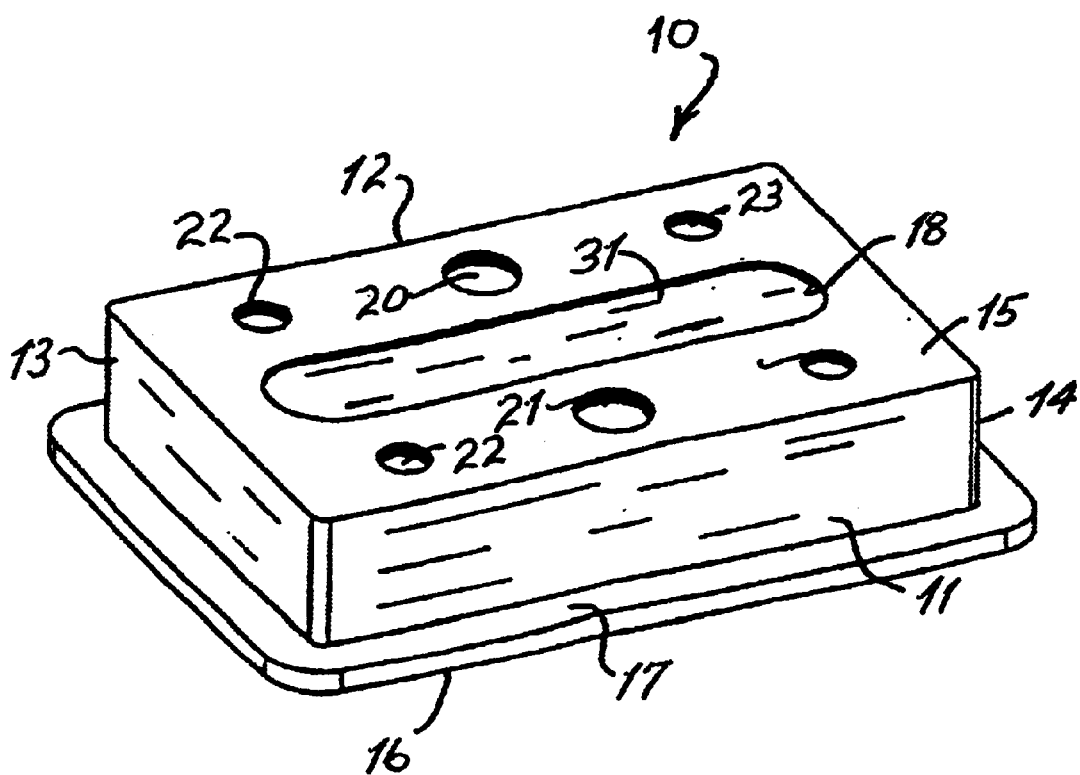
FIG. 1 is a perspective view of the turkey call of the invention.

With continued reference to the drawing figures, the turkey call of the present invention will be defined in greater detail. The call is embodied in a generally rectangular box 10 having elongated side walls 11 and 12 and shorter end walls 13 and 14. The box further includes an top 15 and an enlarged base 16 having a flange 17 which extends outwardly from the perimeter of the side walls 11, 12 and the end walls 13, 14, as shown in FIG. 1. The flange allows the box to be easily grasped in a hand of an individual without the individual's hand having to engage the other surface area of the box which could interfere with the resonance of the box when the call is in use.

An elongated slot 18 is provided in the top 15 and a plurality of openings are provided on either side of the slot in spaced relationship with respect to one another between the slot and the side walls 11 and 12.

In the preferred embodiment, the openings are formed with two enlarged openings 20 and 21 being formed generally centrally of the length of the box and with sets of openings 22 and 23 being provided adjacent the ends of the box. In the preferred embodiment, the openings 22 and 23 are smaller in diameter than the openings 20 and 21. In the embodiment shown, each of the openings in the box are generally circular.

The interior of the box 10 is generally hollow defining a chamber 25 for purposes of creating a sound resonance.

Figure 2:
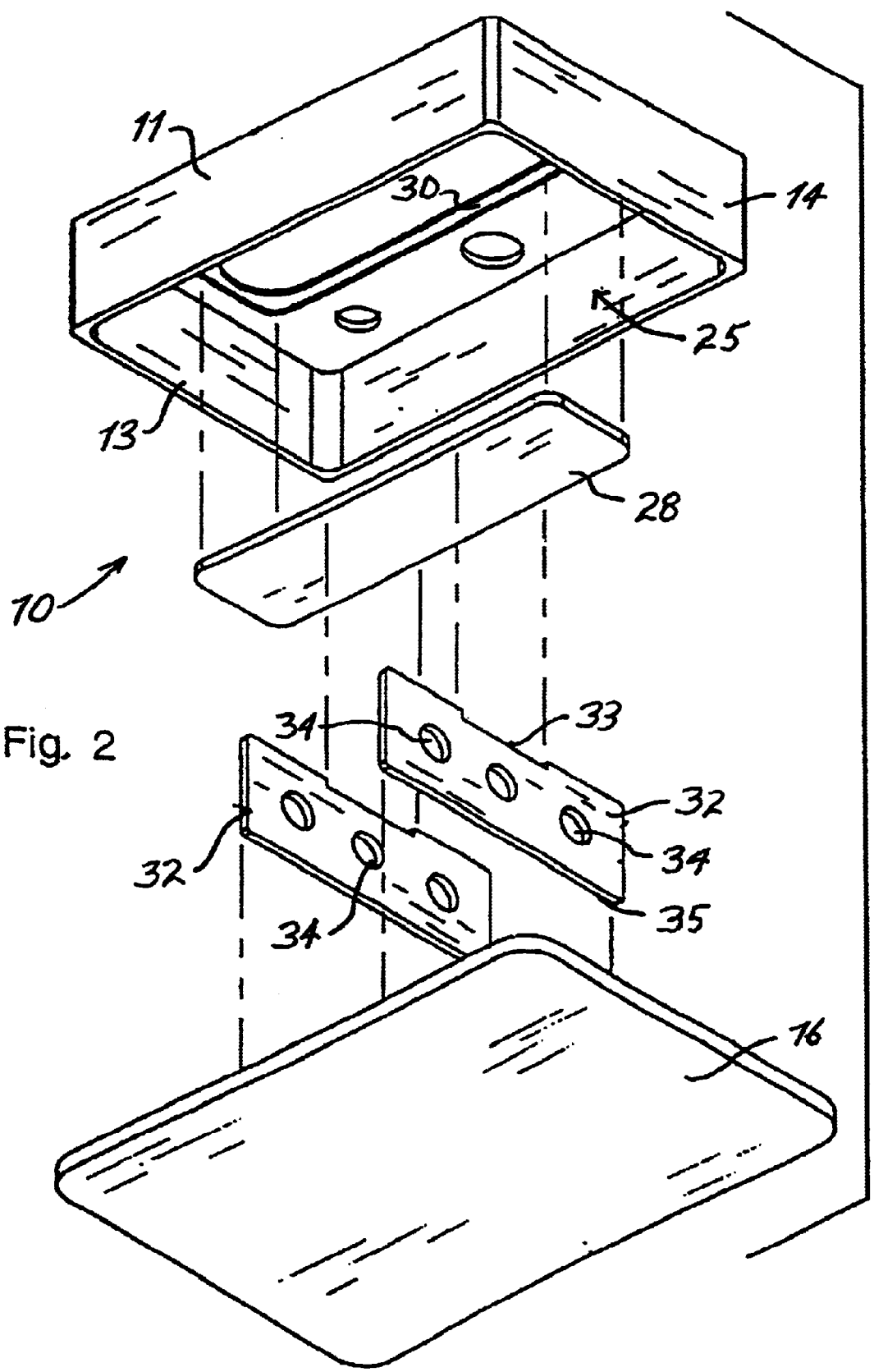
FIG. 2 is an exploded view of the turkey call of the invention.
Figure 3:
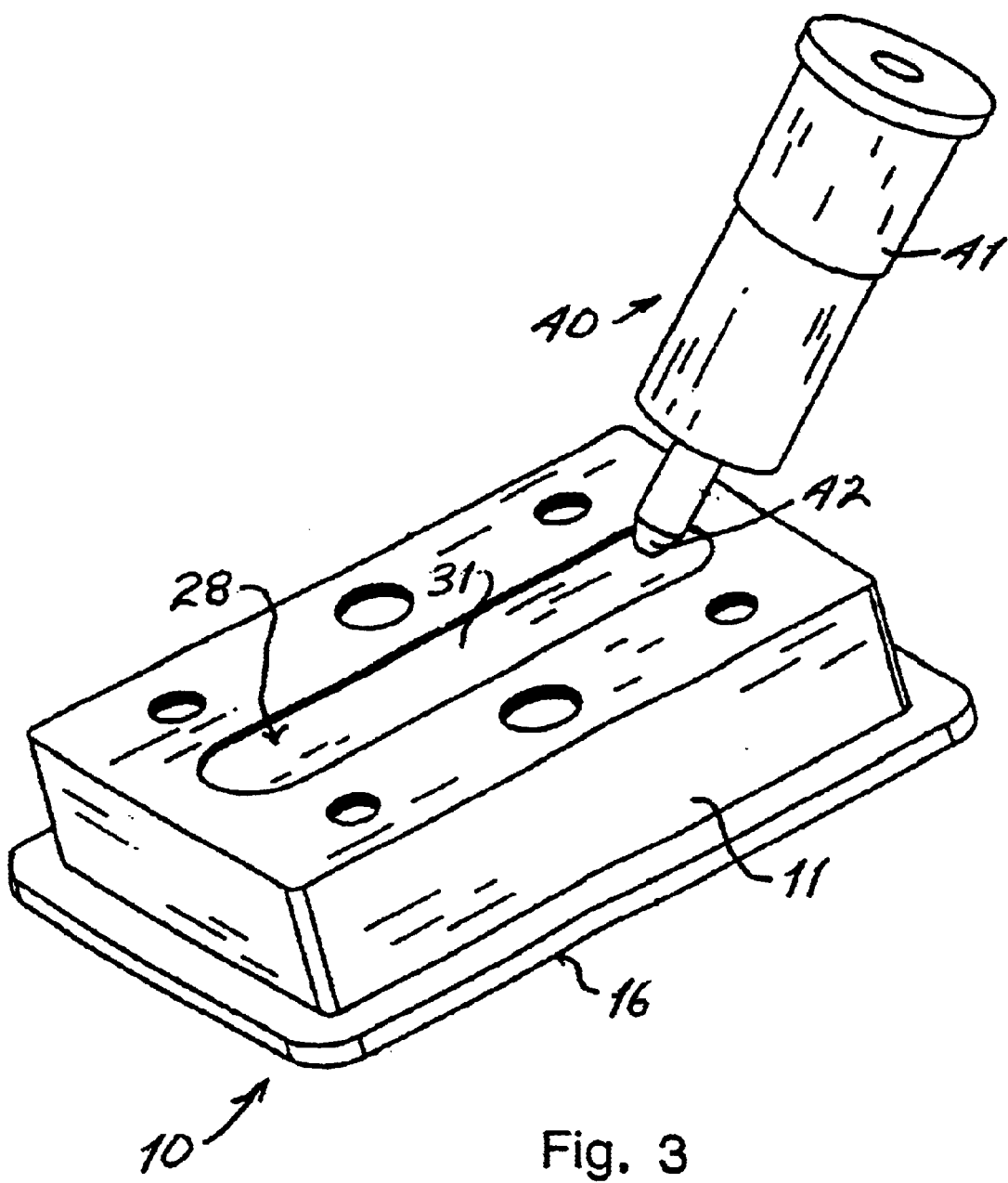
FIG. 3 is a perspective view showing the call box being activated by a striker.

In order to create sound, the present invention utilizes an elongated generally rectangular thin piece of slate 28 which is mounted within the chamber 25 of the box. As shown in FIG. 2, a recessed rectangular seat 30 is formed in the lower surface of the top 15 of the box in surrounding relationship with the elongated slot 18. The slate 28 is of a size to be seated within the recessed area such that an upper face 31 thereof is exposed through the slot 18 at the top of the box, as shown in FIG. 1.

To retain the slate in place and to form further resonance areas within the box, one or more internal baffles 32 are mounted within the box. In the preferred embodiment shown in FIG. 2, two spaced baffles 32 are shown. Each baffle has a notch 33 in an upper edge thereof of a size to cooperatively engage about the width of the slate 28 with the dimensions being such as to retain the slate in tightly seated engagement with the recessed area 30 in the lower surface of the top of the box. Although two baffles are shown in drawing figures, a single baffle or additional baffles may be used in some instances.

To further create sound resonance, a plurality of spaced openings 34 are provided through each of the baffles 32. In the embodiment shown, the baffles divide the interior cavity of the call into three sound chambers of generally equal size or volume. The baffles are of a dimension such that their lower edges 35 abut against an upper surface of the bottom or base 16 of the box when the turkey call is assembled.

The resonance frequencies that can be produced utilizing the invention may be selectively varied by modifying the overall size and configuration of the sound box 10 and by varying the size and placement of the holes and openings associated with the box and the baffles.

In use, the turkey call is held in the hand by an individual engaging the flange 17 of the base 16 so as not to touch the side walls or top wall of the sound box which could effect the resonance frequencies being produced when sound is created by movement of a striker 40 across the upper surface 31 of the slate element secured within the sound box. The striker 40 includes a hand engageable body 41 and a tapered tip 42 which is designed to be pushed against the surface 31 of the slate in order to frictionally vibrate the slate to create sound. In the preferred embodiment, the tip of the striker is formed of a wood or suitable material.

The sound box of the present invention is preferably made of wood, however, in some instances various plastics may be used to create the sound box and the internal baffles as well as the base component.

Although the size of the turkey call box may vary, a preferred structure includes a box length of approximately 3.5 to 3.75 inches, a width of 2.0 to 2.25 inches and a height of 0.50 to 0.875 inches. The holes in the top of the box may vary between approximately 0.25 to 0.375 inch when the box is of the size as set forth above. The walls of the box may be formed of approximately 0.05 to 0.125 inch material with the bottom box thickness being substantially in the same range.

The baffles are generally formed from 2.0 to 2.25 inch in length and are of a height of approximately 0.5 to 0.75 inch with a thickness of 0.06 to approximately 0.09 inch. The hole diameters of the baffles may range from approximately 0.25 to 0.50 inch and the slate may be approximately 3.0 to 3.5 inch in length, 0.625 to 0.875 inch in width with a thickness of approximately between 0.0625 to 0.1875 inch with approximately 0.125 inch being preferred.

The above dimensions are given for reference with respect to a current preferred structure, however, the exact dimensions may be varied in some instances in order to obtain different sound effects.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A turkey call consisting of a sound box having a top, elongated side walls, and end walls and a base, an elongated slot formed in said top, a slate member mounted within the said box in underlying relationship with respect to said slot such that a surface of said slate member is exposed through said slot, at least two internal baffles positioned within said sound box between said side walls thereof, each of said at least two internal baffles having a plurality of openings therethrough, and a striker means for selectively engaging said slate member through said slot in order to create sound vibrations as said striker means is moved in frictional engagement with said surface of said slate member.

2. The turkey call of claim 1 in which said base has flanged portions which extend outwardly relative to said side and end walls of said sound box to thereby provide a grasping surface.

3. The turkey call of claim 1 in which said at least two internal baffles extend from an upper edge engaging said slate member to a lower edge engaging said base and wherein said at least two internal baffles are oriented between said side walls of said sound box.

4. The turkey call of claim 3 including a plurality of openings formed in said top of said sound box intermediate said elongated slot and said side walls.

5. The turkey call of claim 4 in which said openings in said top are of at least two different dimensions.

6. The turkey call of claim 3 in which said at least two internal baffle are spaced with respect to one another so as to define three substantially equal volume sound chamber sections within said sound box.

7. The turkey call of claim 6 including a recessed recess formed in said lower surface of said top of said sound box in which said slate member is seated.

8. The turkey call of claim 7 in which each of said at least two internal baffles has an upper notch therein of a size to cooperatively engage said slate member.

9. The turkey call of claim 8 in which said base has flanged portions which extend outwardly relative to said side and end walls of said sound box to thereby provide a grasping surface.

10. The turkey call of claim 8 in which said slate member is between approximately 0.0625 to 0.1875 inch in thickness.

11. The turkey call of claim 1 including a recess formed in said lower surface of said top of said sound box in which said slate member is seated.

12. The turkey call of claim 1 in which said slate member is between approximately 0.0625 to 0.1875 inch in thickness.

13. A turkey call consisting of a sound box having a top, side wall and a base which defines a hollow resonant sound chamber, an elongated slot formed through said top, a slate member mounted within the said sound chamber so as to be in engagement with a lower surface of said top and in underlying relationship with respect to said slot such that a surface of said slate member is exposed through and covers said slot from within the sound chamber, at least one internal baffle mounted within said sound chamber so as to be in supporting engagement with said slate member and a striker means for selectively engaging said slate member through said slot in order to create sound vibrations as said striker means is moved in frictional engagement with said surface of said slate member.

14. The turkey call of claim 13 in which said base has flanged portions which extend outwardly relative to said side walls of said sound box to thereby provide a grasping surface.

15. The turkey call of claim 13 wherein said at least one internal baffle includes at least one opening therein.

16. The turkey call of claim 15 in which said at least one internal baffle extends from an upper edge engaging said slate member to a lower edge engaging said base and wherein said at least one internal baffle is oriented to divide said sound chamber into separate sections.

17. The turkey call of claim 13 including at least two spaced internal baffles positioned within said sound box between said top and said base for dividing said sound chamber into at least three sections, each of said at least two internal baffles having a plurality of openings therethrough.

18. The turkey call of claim 17 including a plurality of openings formed in said top of said sound box intermediate said elongated slot and said side walls.

19. The turkey call of claim 18 in which said openings in said top are of at least two different dimensions.

20. The turkey call of claim 13 in which said slate member is between approximately 0.0625 to 0.1875 inch in thickness.

* * * * *